United States Patent [19]
Greenaway

[11] 4,143,810
[45] Mar. 13, 1979

[54] DOCUMENTS CODED BY MEANS OF MACHINE-READABLE OPTICAL MARKINGS

[75] Inventor: David L. Greenaway, Birchwil, England

[73] Assignee: LGZ Landis & Gyr Zug AG, Zug, Switzerland

[21] Appl. No.: 742,260

[22] Filed: Nov. 16, 1976

[30] Foreign Application Priority Data

Dec. 23, 1975 [CH] Switzerland .................. 16656/75

[51] Int. Cl.² .................. G06K 19/06; G06K 7/10; G02B 5/32
[52] U.S. Cl. ............................. 235/487; 235/457; 350/3.61
[58] Field of Search .......... 235/61.12 N, 61.11 E, 235/457, 487, 454; 350/3.5, 3.61; 250/569, 555; 365/125

[56] References Cited

U.S. PATENT DOCUMENTS

| | | | |
|---|---|---|---|
| 2,735,617 | 2/1956 | Knutsen | 235/61.12 N |
| 3,814,904 | 6/1974 | Russell et al. | 235/61.12 N |
| 3,873,813 | 3/1975 | Lahr et al. | 235/61.12 N |
| 3,919,447 | 11/1975 | Kilmer, Jr. et al. | 235/61.12 N |
| 4,011,435 | 3/1977 | Phelps et al. | 235/454 |
| 4,020,278 | 4/1977 | Carré et al. | 235/61.12 N |

*Primary Examiner*—Daryl W. Cook
*Attorney, Agent, or Firm*—Morgan, Finnegan, Pine, Foley & Lee

[57] ABSTRACT

There is described a method of producing a document coded with machine-readable information, said document having an information carrier with a multiplicity of storage positions, wherein selected storage positions are occupied by respective machine-readable optical markings, which markings cause a predetermined modification of incident light; the geometrical position of the markings on the information carrier represents coded information. In the method disclosed, such an optical marking is introduced into each storage position, and subsequently, selected optical markings are cancelled or altered. Also described are documents coded by means of the disclosed method, as well as a device for cancelling or altering the optical markings.

10 Claims, 9 Drawing Figures

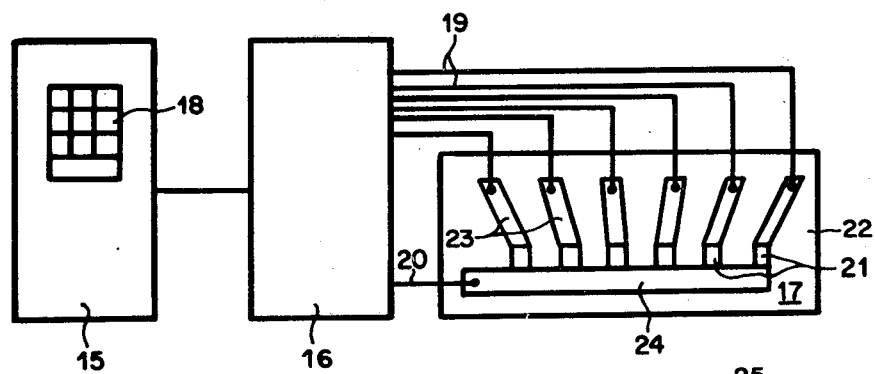
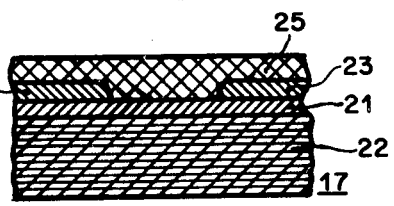
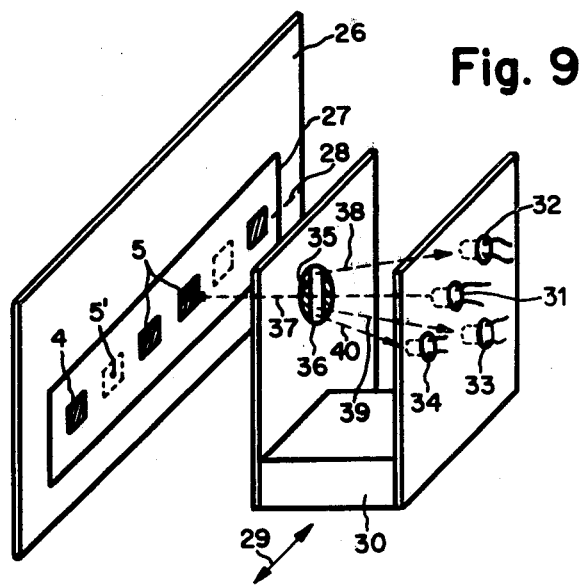

DOCUMENTS CODED BY MEANS OF MACHINE-READABLE OPTICAL MARKINGS

BACKGROUND AND BRIEF DESCRIPTION OF THE INVENTION

This invention relates to documents, and more particularly, but not exclusively to methods of producing documents which have an information carrier with a multiplicity of storage positions, wherein selected storage positions are provided with machine-readable information.

Documents such as identity cards, credit cards, securities, cheques, travel tickets, entrance cards and the like, with machine-readable information thereon, are known in various forms. Most of the documents which are usually employed nowadays, which have coded information in the form of magnetic or optical markings, can be forged at relatively small cost.

A very high degree of security from forging is achieved in a known machine-readable document which contains a hologram, which has the holographic image of a reference number which is binary coded by a given pattern of light spots which are delimited from each other. Such a hologram which includes a coded reference number and information concerning genuineness can be relatively easily read and tested for genuineness, by a machine. On the other hand, maufacture of such a hologram requires thorough technical knowledge and expensive technical aids, which are not readily accessible, so that forgeries which are likely to be successful can only be achieved at very high cost. In a document with such a hologram, the reference number is incorporated at the stage of the holographic recording of the pattern of light spots, that is to say, at an early stage in the production method. This means that a separate hologram must be produced for each document with which an individual reference number is to be associated, and the individual numbers of a series of documents must be known to the producer of the hologram.

According to the present invention there is provided a method of producing a document which has an information carrier with a multiplicity of storage positions, wherein selected storage positions are occupied by respective machine-readable optical markings, which markings cause a predetermined modification of incident light and whose geometrical position on the information carrier represents coded information, in which method a said optical marking is introduced into each storage position, and, subsequently, selected said optical markings are cancelled or altered.

BRIEF DESCRIPTION OF THE DRAWINGS

The invention will now be described by way of example with reference to the accompanying drawings, in which:

FIG. 7 shows a coding device;
FIG. 8 shows a detail of FIG. 7 in cross-section;
and
FIG. 9 shows parts of a reading device.

DETAILED DESCRIPTION OF THE INVENTION

Figure 1:
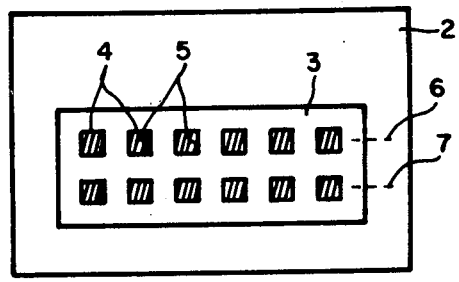
FIG. 1 shows an uncoded document.

In FIG. 1, reference numeral 2 denotes a document, which can be an identity card, a credit card, a security, a cheque, a travel ticket, an entrance card, and so on. The document 2 has an information carrier 3 with a multiplicity of discrete storage positions 4 which are denoted in the drawings by squares shown in dotted or solid lines. In production of the document 2, an optical marking 5 is introduced into each of the storage positions 4 which in the example in FIG. 1 are arranged in two lines 6 and 7. The optical marking 5 causes a characteristic modification of incident light, and represents information concerning genuineness of the document, which is difficult to forge.

The optical markings 5 can be read by a machine. In a reading device which is described in greater detail hereinafter, each of these markings 5 cause a predetermined characteristic modification of the ray path of an incident light beam, by refraction or diffraction of the reflected or transmitted beam. A particularly high degree of security against forging is achieved if the optical markings 5 provided at the storage positions 4 have a structure which causes a characteristic diffraction of incident light. The markings 5 are preferably holograms which can be produced by interference of coherent light or synthetically, that is to say, with the aid of computers. Such holograms are preferably introduced into the storage positions of the information carrier 3 by an embossing process, and in this case the information carrier 3 comprises a thermoplastic material and can be a film or a thin layer applied to the document 2.

Figure 2:
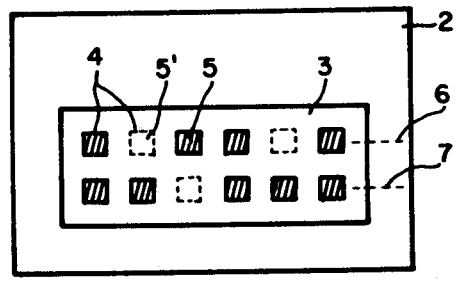
FIG. 2 shows a coded document.

As shown in FIG. 2, in which the same components as in FIG. 1 are denoted by the same reference numerals, coded information is introduced into the document 2 by selected markings 5' being cancelled again, or altered in such a way that they no longer cause the same characteristic modification of incident light, as the unaltered markings 5. In the document 2 which is coded in this manner, the coded information resides in the geometrical position of the remaining markings 5. Each remaining marking 5 represents on the one hand a binary information unit and on the other hand, a piece of information concerning genuineness of the document 2.

In the embodiment of FIG. 2, the second and fifth markings in line 6, and the third marking in line 7, have been cancelled. If a binary "1" is associated with the remaining markings 5, and a binary "0" is associated with the cancelled markings 5', as shown in the drawing, line 6 contains the word 101101, and line 7 contains the word 110111.

For the purpose of reading the coded information stored in the above-described manner, and the information concerning genuineness of the document 2, each storage position 4 is scanned optically in the reading device. Reading can be effected in a serial or parallel mode of operation. In the case of serial reading, all the storage positions 4 are interrogated in succession with a single optical scanning device, while in the case of parallel reading all the storage positions 4 are scanned simultaneously. It is also possible to perform a mixed mode of operation, in which case for example all the storage positions 4 of one column are scanned simultaneously, and the different columns are scanned in succession.

If the optical markings are simple diffraction gratings of predetermined grating frequency and orientation, the optical scanning device can comprise a light source and a single light sensor. The detection of markings 5 in the form of complex light-diffracting structures can be effected with a plurality of light sensors which interrogate the reading light beam which has been modified by a marking 5, from characteristic angles of view. In the case of serial reading, the respective region of the document 2 which is to be interrogated, is limited to a single marking with a shield or the like.

Figure 3:
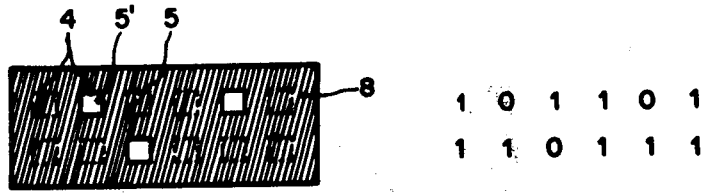
FIGS. 3 to 6 show different information carriers.

It is readily apparent that the optical markings 5 can also be provided outside the storage positions 4, without disadvantageous results. Accordingly, an information carrier, whose entire surface carries a light-modifying marking, in particular a diffraction grating or hologram, can subsequently be coded by selected regions of the marking 5 being cancelled or altered. FIG. 3 shows an information carrier 8 which is coded in this way. The storage positions of this information carrier 8, which are once again denoted by reference numeral 4, are first determined by the local cancellation or alteration of the marking 5. This permits a much greater degree of freedom of coding the document 2. In the reading device, it can be ensured by using a shield or the like that only regions which lie within the storage positions 4 of the information carrier 8 are interrogated.

Figure 4:
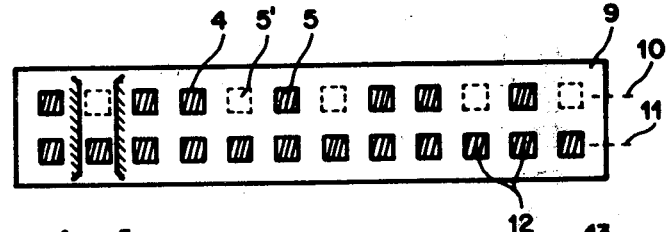

FIG. 4 shows an information carrier 9 which has been coded. The information carrier 9 includes an information track 10 with the optical markings 5 and a timing track 11 which is parallel to the track 10, and which has optical markings 12. The markings 12 of the track 11 are preferably of the same configuration as the markings 5 so that they can be scanned with identical means in the reading device. A light beam which is modified by the markings 12 energizes a light sensor in the reading device, which produces an electrical scanning signal for decoding the stored coded information, in accordance with known processes.

Figure 5:
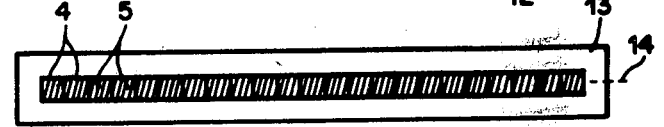
Figure 6:

FIGS. 5 and 6 show that coded information can also be recorded in such a way that the reading signal which is produced in serial scanning from the optical markings 5 of a single information track includes both the information and also a timing signal with which a decoding circuit can be cycled. FIG. 5 shows an information carrier 13 whose information track 14 includes the storage positions 4 with optical markings 5; in this case the storage positions 4 abut in rows without gaps. When coding (see FIG. 6), only selected markings 5' of even-numbered storage positions 4 are cancelled, whereas the markings 5 of uneven-numbered storage positions are not altered. A binary "0" is represented by cancelling two successive even-numbered markings, while in the case of a binary "1", the first even-numbered marking is not cancelled. A document coded in this way can be read with a reading device whose stop aperture is equal to or smaller than the length of a cancelled optical marking 5'. The electrical signal produced in the reading device by scanning the remaining markings 5 is pulse length-coded, and can be decoded in accordance with known processes.

The advantages of the above-described production method are now readily apparent. As the actual coding of the document 2 is effected by cancelling or altering selected optical markings 5', the information which is to be stored in a given example of an issued series of documents 2 only needs to be known in the last phase of the production method. The producer of the optical markings 5 does not therefore need to know the information to be stored and, in large equipment and therefore at low cost and with a small amount of work can produce documents 2 which are all identical and which are only subsequently individualized by the cancellation or alteration of selected markings 5'. The operation of cancelling or altering of selected markings 5, as the last operation in the production method, can be effected in a decentralized fashion directly before issue of a document 2, for which purpose expensive technical aids are not required. The individual information contained in a finished document 2 therefore has to be known only to the person who is entrusted with issuing the document 2, so that the level of security is substantially increased. However, the degree of security from forgeries, which is high in itself, in respect of documents 2 on which information is stored in the form of optical markings 5 such as halograms, diffraction gratings and the like, is not impaired.

Obviously, when coding a document care must be taken that the stored information cannot be altered in a meaningful manner by the unauthorized cancellation or alteration of markings of the coded document. A meaningful alteration of the information on the document would be possible for example in a document which had been coded using the know 4-bit-BCD-code; in this case it would be possible for example for a numerical reference "3" represented by the code 0011 to be converted into one of the numerical references "0", "1" or "2" by the cancellation of markings.

In order to prevent meaningful alteration of information, the optical markings 5' which are cancelled when coding the document are advantageously selected in accordance with an error recognition code. A particularly suitable error recognition code of this kind is one in which faults cannot result in one sign becoming another sign which satisfies the laws of the code and which therefore cannot be recognized as being in error. The laws of the error recognition code can be applied both to the relationship between the individual bits of each reference incorporated in the document, and also the relationship between the individual references.

For example, a decimal number can be coded in accordance with the 2-out-of-5 code, that is to say, each decimal number is represented by two remaining and three cancelled markings so that no meaningful alteration in the stored information can be effected by cancelling markings, in the event of an attempted fraud. Alpha-numerical information can be coded for example in a 3-out-of-7 code. Finally, testing or parity bits can be stored on the document, which bits make it possible for a parity check of the read information to be carried in the reading device.

Coding of the document is advantageously effected in an automatically operating coding device which selects given optical markings on the basis of the information to be stored and the code used, and cancels such selected markings with a cancellation device or alters their characteristic light-modifying properties. In the case of markings in the form of diffraction gratings or holograms which are embossed in thermoplastic material, cancellation or alteration of the markings is preferably effected by a thermal action, the thermoplastic material being locally melted or softened. This can be effected with an electrically heated melting element, by high-frequency or ultrasonic heating, by an electrical arc and the like. The markings can also be cancelled or altered by perforating, scraping off, grinding off, or by a chemical process. Cancellation or alteration of the markings can be effected in a parallel or a serial mode of operation.

Before coding of the document 2, its information carrier 3, 8, 9 or 13 is advantageously covered with a covering layer which is opaque to visible light and which has a higher melting point than the information carrier. When coding such a document 2, the markings 5' can be cancelled or altered by local melting or softening of the information carrier through the covering layer, without damaging it, so that the information remains concealed in visible light.

If the stored information is to be interrogated by transmission, both the cover layer and the information carrier, and possibly the carrier member of the document, which lies below the information carrier, must be transparent to the reading light beam. For example, the individual layers of the document can comprise a material which transmits infra-red radiation, so that the information which is hidden when using visible light can be read with the reading light beam produced by a gallium-arsenide light-emitting diode. In the case of a document which is intended for reflection interrogation, either the cover layer or the information carrier, or a document carrier member which is disposed below the information carrier, must transmit the reading light beam, depending on the side from which the information is to be available for reading; the other layers of the document can be opaque both for visible light and for the reading light beam.

FIG. 7 shows an advantageous embodiment of a coding device. This device comprises an introducing means 15, a converter 16 and a cancelling means 17 which operates in parallel. The introducing means 15 has a scanning field 18 with which numerical or alpha-numerical symbols can be introduced. The converter 16 which is connected between the means 15 and the means 17 converts the symbols introduced, into binary symbols, and by way of leads 19 and 20, on the basis of the information to be stored and the code used, delivers short current pulses to selected heating elements of a multiplicity of heating elements 21 which are arranged on a carrier 22 of the cancellation means 17 in the same geometrical position as the storage positions 4 (FIGS. 1 to 6) on the document to be coded. When this is done, the selected markings 5' of the document (not shown in FIG. 7) which lies in close contact on the heating elements 21 are destroyed or altered by the thermal effect.

Each heating element 21 is preferably formed by a thin layer of electrical resistance material which is applied to the carrier 22 that comprises insulating material. Electrodes 23 and 24 which electrically connect the leads 19 and 20 to the heating elements 21 advantageously comprise a thin layer of electrically conductive material. The heating elements 21 and the electrodes 23 and 24 can be made by photo-lithographic methods or by etching methods.

As can be seen from FIG. 8, which shows a greatly enlarged view in cross-section of the cancellation means 17, a thin insulating layer 25 is advantageously applied to the free regions of the heating elements 21 and to the electrodes 23 and 14, thereby providing a smooth surface for the cancellation means, and providing protection for the parts which lie below the insulating layer 25.

FIG. 9 shows parts of a reading device for reading a document 26 which has been produced in accordance with the above-described method and whose information carrier 27 has a single information track 28 with optical markings 5 in the form of embossed reflection holograms. Cancelled markings are again denoted by reference 5'. A light source 31, light sensors 32 to 34, a shield 35 and a lens 36 are secured to a carriage 30 which is movable in a manner which is not shown in detail, in the direction of a double-headed arrow 29, parallel to the information track 28.

For the purposes of reading the document 26 which is inserted into a holder (not shown), the carriage 30 is moved along the information track 28 at a constant or known speed. When this is done, a reading light beam 37 from the light source 31 passes in succession through the lens 36 and the shield 35, to impinge on the individual storage positions 4. If the particular storage position upon which the light beam impinges is occupied by a genuine unaltered marking 5, the light beam 37 is modified in the predetermined characteristic manner. In the embodiment illustrated, three light beams 38 to 40 are reflected by the markings 5, and these light beams represent the holographic image of a light spot pattern which is holographically stored in the form of a marking, and fall onto the light sensors 32 to 34 which are arranged in appropriate characteristic angles of view. An electronic switching logic means (not shown) evaluates the signals produced by the light sensors 32 to 34, and responds.

If on the other hand the reading light beam 37 impinges on a storage position 4 with a cancelled or altered marking 5' the ray path of the reading device is not modified in the characteristic manner, the light sensors 32 to 34 are not energized, or are not energized with the correct intensity, and the electronic switching logic means does not respond. The reading device therefore checks the genuineness of the document 26, and at the same time reads the stored information. The output signal of the switching logic means can be decoded with means known in the data storage art.

The above-described reading device can be modified in many ways. It is possible for the document 26 to be transported when reading the information, instead of the carriage 30. For the purposes of reading a document with a plurality of information tracks, such tracks can be scanned in succession; however, separate light sensors can also be arranged on the carriage 30, for each information track. Finally, all the storage positions 4 can be simultaneously scanned with a multiplicity of light sensors and one or more light sources.

I claim:

1. A coding device for cancelling or altering selected optical markings, for use in producing a machine-readable coded document having an information carrier with a multiplicity of storage positions, wherein selected storage positions are occupied by respective machine-readable optical markings, which markings cause a predetermined modification of incident light and whose geometrical position on the information carrier represents coded information, comprising:

introducing means for introducing numerical or alpha-numerical information to be coded on the information carrier;

converting means for converting the numerical or alpha-numerical information into binary symbols; and cancellation means for cancelling or altering selected said optical markings in accordance with said binary symbols, to code the information onto the information carrier, said cancellation means comprising a multiplicity of heating elements which are electrically connected to the converting means, and which are arranged in the same geometrical position as the storage positions of the documents to be coded.

2. A coding device according to claim 1 wherein each heating element comprises a carrier of electrical insulating material, a thin layer of electrical resistance material applied to said carrier, and a thin insulating layer applied to said layer of electrical resistance material.

3. A method of producing a document coded with machine-readable information, said document having an information carrier of thermoplastic material with a multiplicity of storage positions, wherein selected storage positions are occupied by respective machine-readable optical markings, which markings cause a predetermined modification of incident light, and whose geometrical position on the information carrier represents coded information, comprising embossing an optical marking into each storage position, and, subsequently, cancelling or altering selected said optical markings, said selected markings having been selected in such a way that an alteration of the stored information by cancelling or altering further optical markings can be ascertained.

4. A method according to claim 3, wherein said optical markings cause a characteristic diffraction or refraction of incident light.

5. A method according to claim 4, wherein the selected said optical markings are thermally cancelled or altered.

6. A method according to claim 5, further comprising covering the information carrier, before cancellation or alteration of the selected optical markings, with a cover layer which is opaque to visible light and which has a higher melting point than the information carrier.

7. A method according to claim 3, wherein the selected said optical markings are thermally cancelled or altered.

8. A method according to claim 7 further comprising covering the information carrier, before cancellation or alteration of the selected optical markings, with a cover layer which is opaque to visible light and which has a higher melting point than the information carrier.

9. A method of producing a document coded with machine-readable information, said document having an information carrier of thermoplastic material with a multiplicity of storage positions, wherein selected storage positions are occupied by respective machine-readable optical markings, which markings cause a predetermined modification of incident light, and whose geometrical position on the information carrier represents coded information, comprising embossing an optical marking into each storage position, and, subsequently, thermally cancelling or altering selected said optical markings.

10. A method of producing a document coded with machine-readable information, said document having an information carrier of thermoplastic material with a multiplicity of storage positions, wherein selected storage positions are occupied by respective machine-readable optical markings, which markings cause a characteristic diffraction or refraction of incident light, and whose geometrical position on the information carrier represents coded information, comprising embossing an optical marking into each storage position, and, subsequently, cancelling or altering selected said optical markings.

* * * * *